May 4, 1965 E. S. THOMAS 3,181,910
PLATFORM FOR EXTENSIBLE TRAILERS
Filed Jan. 29, 1962 2 Sheets-Sheet 1
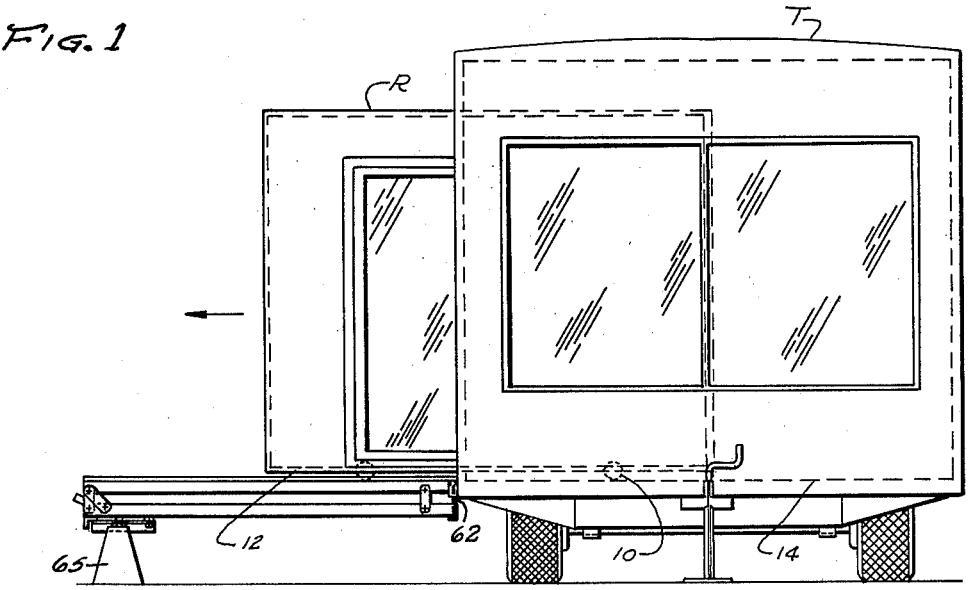
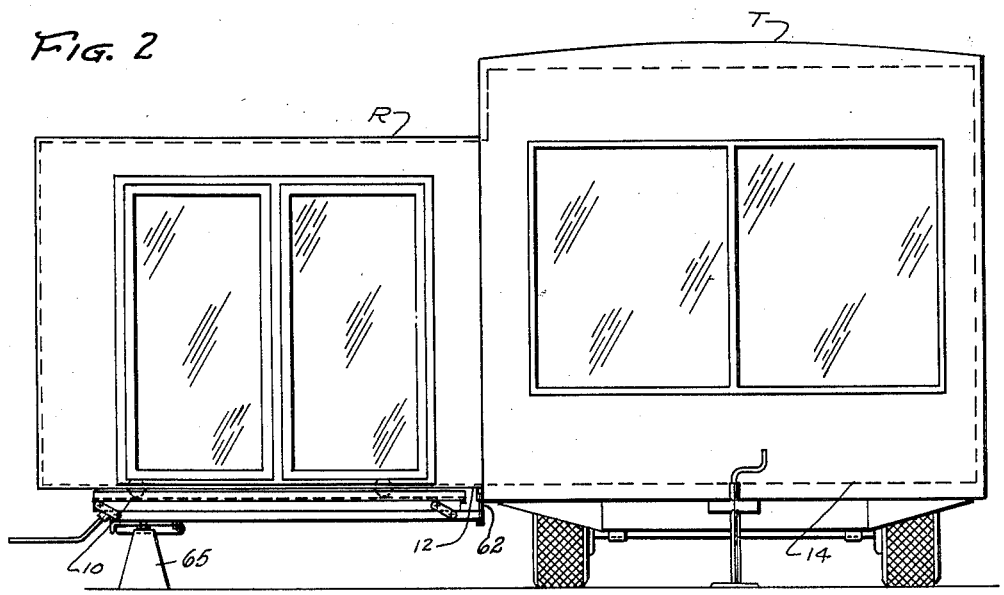
INVENTOR.
ERWIN S. THOMAS
BY
HERBERT C. SCHULZE
ATTORNEY May 4, 1965  E. S. THOMAS  3,181,910
PLATFORM FOR EXTENSIBLE TRAILERS
Filed Jan. 29, 1962  2 Sheets-Sheet 2
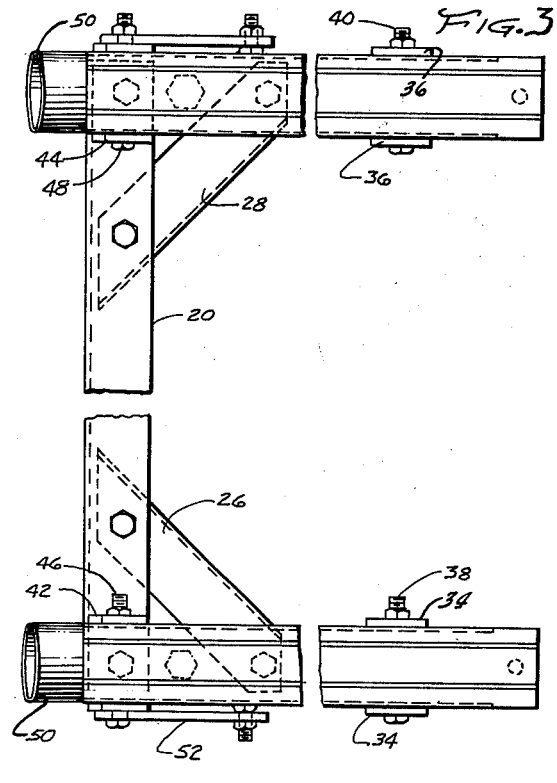
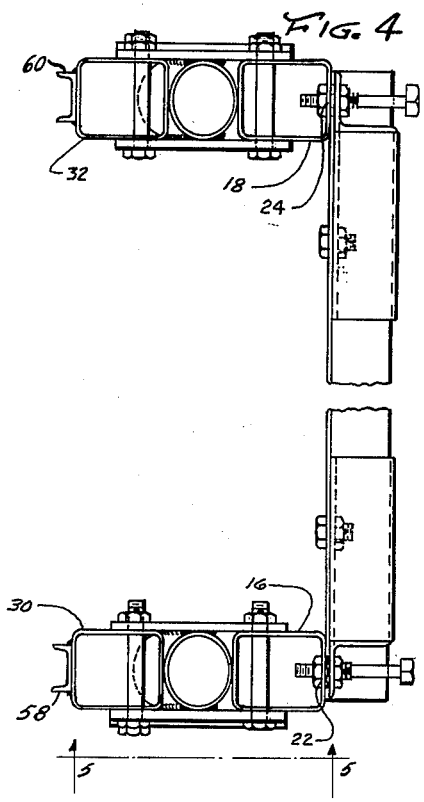
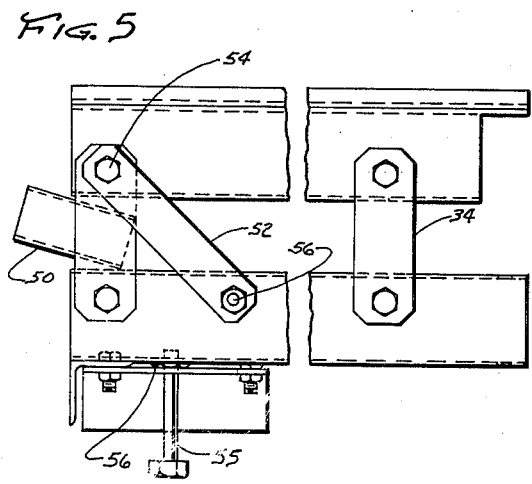
INVENTOR.
ERWIN S. THOMAS
BY
HERBERT C. SCHULZE
ATTORNEY

United States Patent Office 3,181,910
Patented May 4, 1965

3,181,910
PLATFORM FOR EXTENSIBLE TRAILERS
Erwin S. Thomas, 1987 Via Santiago, Corona, Calif.
Filed Jan. 29, 1962, Ser. No. 169,262
2 Claims. (Cl. 296—23)

This invention relates to portable platforms for expansible trailers and particularly to devices for lowering and supporting roll-out trailer rooms to desired position.

One of the main objects of the invention is in the provision of a trailer attaching platform that receives the roll-out expansible portions thereof and lowers them to normal floor sustaining position.

Expansible trailers of various types are so conventional as to obviate description. They are transported to desired temporary location in the usual manner. When located, it is necessary to roll-out the expansible room or rooms thereof to a complete expanded living unit. Heretofore, this transforming of the trailer into an expanded and entire home structure has been accomplished with complicated structural elements and considerable manual effort. It is the theory of the present invention to provide a relatively simple portable platform that can be easily attached and readily set up alongside the trailer so that the expansible room portions thereof can be easily rolled out upon the platform in such manner that the floor may be quickly lowered to a flush position with the trailer floor.

It is customary that the floor of the expansible portion of the trailer, either a room or the entire trailer, be supported on rollers slightly above the trailer floor. It is intended that the platform, as herein disclosed, be manually attached to the trailer body or frame and supported upon pillars at its outer end in position to receive the roll-out trailer portions. The platform is so arranged that lever actuated runways receive the roller elements of the expansible rooms. When the rooms are rolled out to extended position the lever actuated runways are manually lowered to a position with floor levels flush for satisfactory living condition.

Another object of the invention is to provide a portable and readily attached platform for receiving in roll-out manner the expansible portions of trailers and lowering them to flush floor positions.

Yet another object of the invention is to provide a lever actuated platform for receiving expansible trailer sections and either lowering them to flush floor position or elevating them for easy return to trailer telescoping position.

Still another object of the invention is in the provision of a manually operated platform for receiving and lowering expansible trailer elements into trailer aligning position.

A further object of the invention lies in a portable platform adapted to control the position of an extensible trailer floor section throughout its entire area.

A still further object of the invention is in the provision of a roll-out trailer platform that can be lowered and raised manually at either side.

The foregoing and other objects and advantages of this invention will be clear to those skilled in the art upon reading the following specification in conjunction with the attached drawings in which:

FIGURE 1 is an end elevational view of the platform in raised position and the trailer section partially expanded in roll-out position;

FIGURE 2 is a similar view with the trailer section completely expanded and lowered upon the platform to flush floor position;

FIGURE 3 is a plan view of the platform providing a preferred embodiment of the invention;

FIGURE 4 is an end elevational view of FIGURE 3; and

FIGURE 5 is a partial side elevation taken on the line 5—5 of FIGURE 4.

Referring to the drawings, a conventional expansible type trailer is referred to generally as T. An expansible section or room is also referred to generally as R. The structure is well-known and may vary as to size of the expansible portion R, but the general arrangement is entirely conventional. It is customary that the section or room R be sustained on plural rollers 10 within the trailer with the floor 12 thereof slightly elevated above the fixed floor 14 of the trailer. During transportation it is obvious that the disposition of the relative floor levels is unimportant. However, when a temporary but fixed location has been reached, it is necessary to run-out or roll-out the expansible section R to the position shown in FIGURE 2. This is easily accomplished by means of the presently disclosed portable platform.

The platform includes spaced rectangular iron side frames 16 and 18 which are connected at their outer ends by means of a spacer bar 20 bolted thereto at 22 and 24, respectively. Dual angularly disposed braces 26 and 28 are bolted or welded to the spacer bar 20 and the side frames 16 and 18. Upon and above the side frames 16 and 18 are similarly shaped platform members 30 and 32, respectively. The platform members 30 and 32 are lever connected to the side frames 16 and 18 respectively and the lever frame connecting means for dual platform members is identical.

At the trailer or inner end of the platform dual straps or levers 34 and 36 are bolted at 38 and 40 to the side frames and platform members. This connection provides a pivotal lever mounting between the elements. At the outer end of the platform similar dual straps or levers 42 and 44 are bolted in the same manner at 46 and 48, respectively, to the platform and frame members. A manual operated lever handle or tube 50 is welded between the straps 42 and 44 as shown in FIGURE 5. Movement of the dual handles 50 at either side, will raise or lower the platform members 30 and 32. A stabilizing strap 52 on either side of the platform is bolted in a pivotal manner at 54 to the platforms. The stabilizers 52 have a detachable screw connection 56 with the side frames 16 and 18. The stabilizer straps maintain the platforms 30 and 32 in fixed raised position. They are unscrewed when it is desired to lower the platforms 30 and 32 which is accomplished by manual manipulation of the handles or lever bars 50. The bars or tubes 50 are also manually actuated to raise the platforms when desired. Leveling bolts 55 threaded into nuts 56 welded to the outer under sides of platform members 16 and 18 are used to adjust and level the platform.

A pair of channel iron runways 58 and 60 are welded on the upper sides of the platforms 30 and 32. These runways obviously receive the trailer section rollers in either run-out or run-in operations. At the inner ends of the side frames 16 and 18 trailer frame or body attachment bolts or means 62 are secured. They can be fashioned in any conventional manner as they provide solely a manual detachable mechanism. Pillars 65 support the portable platforms at their outer ends. They are positioned in a manner to support the expansible trailer section in level position.

The operation of the portable platform is relatively simple. Once attached and pillar supported alongside the trailer it is merely necessary to roll out the expansible section thereon. The stabilizers hold the platform runways in elevated position as shown in FIGURE 1. When the room or section is in living position the stabilizers are relieved and the bars 50 permit manual lowering of the lever actuated runways to a position where the floors of the expansible portion and trailer are flush. If any adjustment of a minor nature should be required, it is merely necessary to place blocks between the side frames and platforms. It is apparent that elevation of the expansible section to return roll-in position is accomplished by manual actuation of the handles 50 and securement of the stabilizers in fixed elevated position.

While the embodiment of this invention as shown and described is fully capable of performing the objects and achieving the advantages desired, many modifications will be clear to those skilled in the art without departing from the inventive concepts herein disclosed. It is not my intention to be limited by the specific embodiment shown and described which has been shown and described for illustrative purposes only.

I claim:

1. A trailer platform of the type supported by pillar means at its outer end for receiving and supporting the extensible housing section of trailers having a main housing portion on a frame and a laterally extensible housing section on rollers, comprising, a pair of spaced, longitudinal frame members each capable of connection at their inner ends by attachment bolts to the trailer frame and connected at their outer ends by a spacer bar, a pair of spaced, longitudinal platform members each superimposed on said frame members and connected at their inner ends to the inner ends of said frame members by a pair of pivoted levers and connected at their outer ends to the outer ends of said frame members by a second pair of pivoted levers, said platform members having runways on their top sides to receive said rollers, a pair of handle members each rigidly mounted between said second pair of pivoted levers for raising and lowering said platform members, and a pair of detachable stabilizer members each diagonally connected from the outer ends of said platform members to the outer ends of said frame members to maintain the platform members in raised position.

2. A trailer platform of the type supported by pillar means at its outer end for receiving and supporting the extensible housing section of trailers having a main housing portion on a frame and a laterally extensible housing section on rollers comprising, a pair of spaced longitudinal frame members each capable of connection at their inner ends by attachment bolts to the trailer frame and connected at their outer ends by a spacer bar, a pair of spaced, longitudinal platform members each superimposed on said frame members and connected at their inner ends to the inner ends of said frame members by a pair of pivoted levers and connected at their outer ends to outer ends of said frame members by a second pair of pivoted levers, said platform members having runways on their top sides to receive said rollers, handle means mounted between said second pair of pivoted levers for raising and lowering said platform members, and a pair of detachable stabilizer members, each diagonally connected from the outer ends of said platform members to the outer ends of said frame members to maintain the platform members in raised position.

References Cited by the Examiner

UNITED STATES PATENTS

| | | | |
|---|---|---|---|
| 368,883 | 8/87 | Forbes. | |
| 1,017,290 | 2/12 | Ham | 214—38.22 X |
| 2,519,517 | 8/50 | Van Tassel | 296—23 |
| 2,813,747 | 11/57 | Rice | 296—23 |

A. HARRY LEVY, *Primary Examiner.*

PHILIP ARNOLD, *Examiner.*